July 14, 1931. L. M. MIYASAKI 1,814,325
SAFETY DEVICE FOR AEROPLANES
Filed Nov. 5, 1929 2 Sheets-Sheet 1
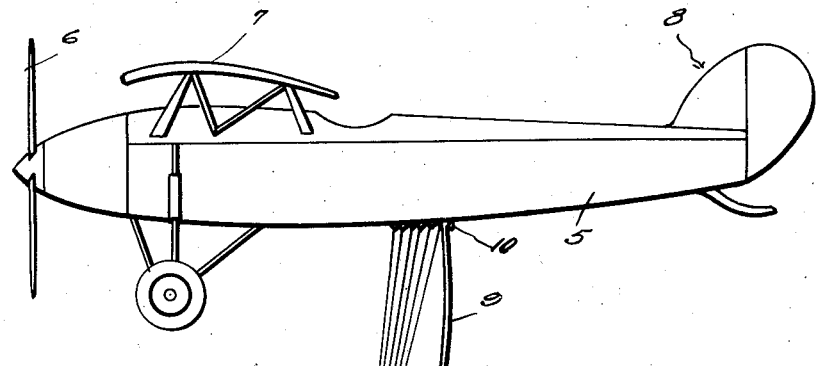
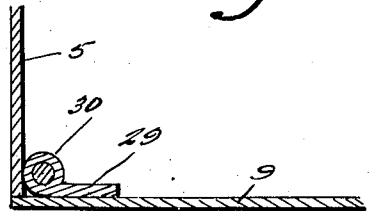
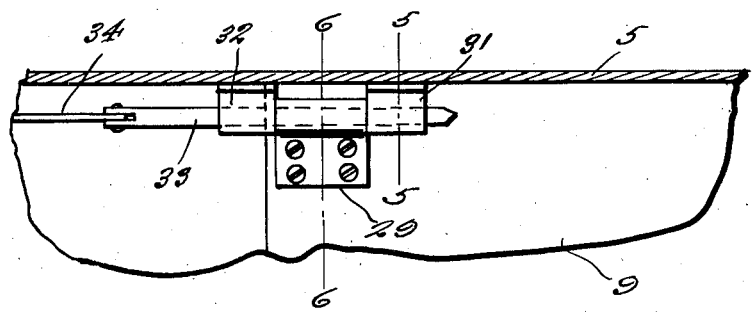
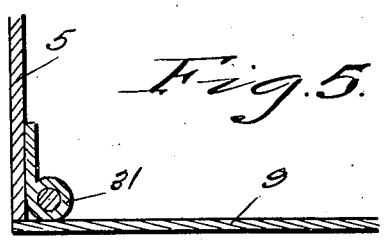
Inventor
Leon M. Miyasaki
By Clarence A. O'Brien
Attorney

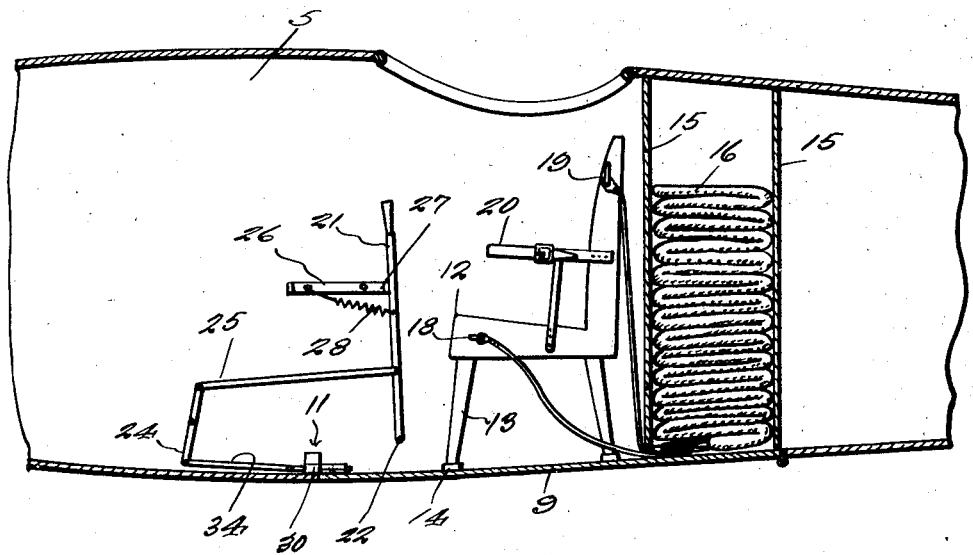

Patented July 14, 1931

1,814,325

UNITED STATES PATENT OFFICE

LEON M. MIYASAKI, OF LOS ANGELES, CALIFORNIA

SAFETY DEVICE FOR AEROPLANES

Application filed November 5, 1929. Serial No. 404,931.

This invention appertains to new and useful improvements in aeronautics, and more particularly to a novel safety device whereby occupants of aeroplanes may save themselves from injury by releasing themselves from the aeroplane attached to a parachute.

An important object of the invention is to provide a safety apparatus for aeroplanes wherein the occupant's seat has a parachute attached thereto, and release means whereby the seat and the parachute may be permitted to fall from the areoplane.

Another important object of the invention is to provide a parachute structure which will not necessitate the tipping of the chute after the user has been disconnected from the aeroplane.

These and numerous other important objects and advantages of the invention will become more apparent to the reader after considering the invention as described and claimed hereinafter.

In the drawings:

Figure 1 represents a side elevation of an aeroplane showing the improved safety device in use.

Figure 2 represents a fragmentary enlarged longitudinal sectional view showing the safety device in inoperative position.

Figure 3 represents a perspective view of one of the controlling details.

Figure 4 represents a fragmentary horizontal sectional view showing the means whereby the seat may be released.

Figure 5 represents a vertical sectional view taken substantially on line 5—5 of Figure 4.

Figure 6 represents a vertical sectional view taken substantially on line 6—6 of Figure 4.

Referring to the drawings, wherein like numerals designate like parts, it will be seen that 5 indicates the usual fuselage of an aeroplane, the forward portion thereof having the usual motor mounted therein, which motor is equipped with the propeller 6. 7 denotes the usual wings, while numeral 8 generally refers to the rudder, stabilizer, elevator, and other features at the rear end of the fuselage.

The present invention consists in providing an opening in the floor of the fuselage and normally maintaining this opening closed by means of a trap door 9. This trap door 9 is hingedly secured to the floor of the fuselage as at 10 and is prevented from slipping downwardly by means of the latch means generally referred to by numeral 11.

A seat 12 having the legs 13 is adapted to rest upon the trap door 9 with the lower ends of the legs resting within the sockets 14 on the said trap door. A pair of spaced partitions 15—15 are arranged transversely within the fuselage rearwardly of the seat 12 and within the space between these partitions is folded the parachute 16 in substantially the manner shown in Figure 2. This parachute has the cord 17 extending to the usual ring 17 and from this ring cables 18 connect with the seat 12 at the points 18 and 19.

A strap 20 may be provided on the seat to prevent the occupant from becoming displaced when the chair drops through the opening in the fuselage upon the release of the trap door.

A means for releasing the trap door includes a hand lever 21 pivotally connected to the side wall of the fuselage as at 22. Centrally mounted between the side walls of the fuselage is a shaft 23 at each end of which is a rocker arm 24. A connecting rod 25 is pivotally connected at one end to the lever 21 while the same is pivotally connected at its opposite end to the upper end of one of the rocker arms 24.

A bracket 26 has a stop 27 thereon against which the lever 21 normally abuts and is tensionally maintained by the spring 28.

At the corners of the free end of the closure 9 are plates 29 suitably secured thereto and provided with barrels 30 extending in a direction longitudinally of the fuselage 5 and each alined with a pair of sleeves 31 and 32, one at each end of the barrel 30 and both being suitably secured to the corresponding side wall of the fuselage. Slidably disposed through each barrel 30 and its associated sleeves 31 and 32 is a bolt 33 through which is connected one end of a rod 34, the opposite end of the rod being pivotally connected to the lower end of the corresponding rocker arm 24 in the manner as shown in Figure 2.

It will thus be seen that when the occupant is in danger and wishes to release himself from the aeroplane, a pull rearwardly on the upper end of the lever 21 will rock the arms 24—24 and resultantly disengage the bolt 33 from the barrels 31 and associated sleeves. Obviously, the weight of the occupant sitting in the chair 12, which chair is superimposed on the closure 9 will cause the swift downward swinging of the closure and the sudden pull on the cables connected to the parachute will almost instantly dislodge the parachute from the parachute compartment.

It will thus be seen that the present invention presents emergency means for aircraft whereby the occupant may instantly become disengaged therefrom and descend safely to the ground by parachute without the necessity of employing rip cords or other means for releasing the parachute.

The foregoing specification, while being in detail, nevertheless permits various changes in the shape, size and materials of the structure during the manufacture thereof without departing from the spirit and scope of the invention as claimed hereinafter.

Having thus described the invention, what I claim as new is:—

1. In combination with an aeroplane having a longitudinal opening in the bottom thereof, a pivotally mounted trap door opening longitudinally of said aeroplane for closing said opening, sockets on the inner side of said trap door, a rigid chair having like members engageable within said sockets, a partition disposed transversely of said aeroplane and rearwardly of said chair having a parachute therein, means connecting said parachute to said chair, and means for releasing said trap door to permit said chair and parachute to drop completely through said opening.

2. An escape device of the type described for an aircraft consisting of a portion of the fuselage of the aircraft provided with an opening on its bottom, a hinged trap door closing the opening, a chair and a parachute gravitationally supported on the trap door, a partition between the chair and the parachute, a flexible connection between the chair and the parachute, said trap door adapted to be released to drop the chair and parachute through said opening, said flexible connection adapted to maintain the chair positioned for supporting an occupant when the parachute has opened.

In testimony whereof I affix my signature.

LEON M. MIYASAKI.